United States Patent [19]
Miyashita et al.

[11] Patent Number: 5,220,904
[45] Date of Patent: Jun. 22, 1993

[54] AIR-FUEL RATIO CONTROL SYSTEM FOR INTERNAL COMBUSTION ENGINES

[75] Inventors: Yukio Miyashita; Hiroshi Mifune; Atsushi Matsubara, all of Wako, Japan

[73] Assignee: Honda Giken Kogyo Kabushiki Kaisha, Tokyo, Japan

[21] Appl. No.: 935,326

[22] Filed: Aug. 26, 1992

[30] Foreign Application Priority Data

Aug. 30, 1991 [JP] Japan .................... 3-245226

[51] Int. Cl.⁵ .............................. F02D 41/16
[52] U.S. Cl. ................... 123/680; 123/681; 123/687; 123/90.16
[58] Field of Search ............. 123/90.16, 679, 680, 123/681, 682, 683, 684, 687

[56] References Cited

U.S. PATENT DOCUMENTS

| | | | |
|---|---|---|---|
| 4,509,489 | 6/1985 | Hasegawa et al. | 123/680 |
| 4,895,122 | 1/1990 | Noguchi et al. | 123/680 |
| 4,938,187 | 7/1990 | Seki | 123/90.16 |
| 4,960,083 | 10/1990 | Seki et al. | 123/90.16 |
| 5,033,440 | 7/1991 | Kumagai et al. | 123/680 X |
| 5,056,491 | 10/1991 | Tsukamoto | 123/682 X |

*Primary Examiner*—Willis R. Wolfe
*Attorney, Agent, or Firm*—Nikaido, Marmelstein, Murray & Oram

[57] ABSTRACT

An air-fuel ratio control system for an internal combustion engine, which detects the actual air-fuel ratio of a mixture supplied to the engine, detects operating conditions of the engine, calculates a desired air-fuel ratio based on the detected operating conditions of the engine, and calculates an air-fuel ratio correction value applied for feedback-controlling the actual air-fuel ratio to the calculated desired air-fuel ratio. A change rate at which the air-fuel ratio correction value is to be changed, is set such that when a change has occurred in the operating mode of the engine, the change rate is set to and held at a smaller value than a value assumed when no change has occurred in the operating mode, over a predetermined time period from the time the change occurred.

8 Claims, 8 Drawing Sheets

AIR-FUEL RATIO CONTROL SYSTEM FOR INTERNAL COMBUSTION ENGINES

BACKGROUND OF THE INVENTION

1. Field of the Invention

This invention relates to an air-fuel ratio control system for internal combustion engines, and more particularly to air-fuel control upon a change in the operating condition of the engine, i.e., air-fuel ratio control applied when the engine is in a transient condition.

2. Prior Art

Conventionally, an air-fuel ratio control system for internal combustion engines is well known, which feedback-controls the air-fuel ratio of a mixture supplied to the engine to a desired value in response to the output from an exhaust gas component concentration sensor arranged in the exhaust system and having an output characteristic in approximate proportion to the concentration of an exhaust gas component.

In an air-fuel control system of this kind, an air-fuel ratio correction coefficient is calculated in response to the output from the exhaust gas component concentration sensor, and the air-fuel ratio of the mixture is feedback-controlled to a desired value by the use of the air-fuel ratio correction coefficient.

The above-mentioned air-fuel ratio correction coefficient is calculated by adding together a P-term KLAFP, an I-term KLAFI, and a D-term KLAFD obtained, respectively, by proportional control (P-term control), integral control (I-term control), and differential control (D-term control) which are executed in response to operating conditions of the engine.

In the air-fuel ratio control system, since the air-fuel ratio correction coefficient is calculated in response to operating conditions of the engine as mentioned above, the air-fuel ratio correction coefficient varies depending upon a change in the operating mode which is determined by operating conditions of the engine, etc.

However, when the air-fuel ratio flactuates due to a change in the operating mode, there is a time lag between the time of occurrence of fluctuation and the time the exhaust gas component concentration sensor detects the flactuation. As a result, if the air-fuel ratio is feedback-controlled by the use of the air-fuel ratio correction coefficient which is changed at a change rate appropriate to a steady operating condition of the engine, upon a change in the operating mode, the air-fuel ratio largely deviates from the desired value, which results in degraded exhaust emission characteristics due to an increase in the amount of noxious components in the exhaust gases, as well as in degraded driveability.

SUMMARY OF THE INVENTION

It is the object of the invention to provide an air-fuel ratio control system for internal combustion engines, which is capable of preventing the air-fuel ratio from largely deviating from a desired value upon a change in the operating mode, to thereby prevent degraded exhaust emission characteristics and degraded driveability.

To attain the above object, the present invention provides an air-fuel ratio control system for an internal combustion engine, having air-fuel ratio detecting means for detecting an actual air-fuel ratio of a mixture supplied to the engine, operating condition detecting means for detecting operating conditions of the engine, air-fuel ratio calculating means for calculating a desired air-fuel ratio based on operating conditions of the engine detected by the operating condition detecting means, and corrected value calculating means for calculating an air-fuel ratio correction value applied for feedback-controlling the actual air-fuel ratio detected by the air-fuel ratio detecting means to the desired air-fuel ratio calculated by the air-fuel ratio calculating means, The air-fuel ratio control system according to the invention is characterized by an improvement comprising:

(1) operating mode change determining means for determining whether or not a change has occurred in operating mode of the engine; and (2) corrected value changing means for setting a change rate at which the air-fuel ratio correction value is to be changed, such that when the operating mode change determining means determines that a change has occurred in the operating mode of the engine, the change rate is set to and held at a smaller value than a value assumed when no change has occurred in the operating mode, over a predetermined time period from the time the change occurred.

The engine has at least one fuel injection valve, at least one intake valve, and at least one exhaust valve, and the air-fuel ratio control system includes idling condition determining means for determining whether or not the engine is in the idling condition, valve timing changeover means for changing valve timing of at least one of the intake valve and the exhaust valve, valve timing detecting means for detecting operating conditions of the valve timing changeover means, and injection timing determining means for determining timing of injection of fuel by the fuel injection valve.

The operating mode includes an operating mode detected by the idling condition detecting means, an operating mode detected by the valve timing detecting means, an operating mode determined based upon the desired air-fuel ratio calculated by the air-fuel ratio calculating means, and an operating mode determined by the injection timing determining means.

The operating mode change determining means determines whether or not a change has occurred in the operating mode, from at least one combination of the operating modes.

Preferably, the air-fuel ratio detection means comprises an exhaust gas component concentration sensor having an output characteristic approximately proportional to concentration of a specific component in exhaust gases emitted from the engine, the predetermined time period being a time period between the time fuel is injected by the fuel injection valve and the time the fuel reaches, in the form of a combustion gas, the exhaust gas component concentration sensor.

The above and other objects, features, and advantages of the invention will be more apparent from the following detailed description taken in conjunction with the accompanying drawings.

DETAILED DESCRIPTION

The invention will now be described in detail with reference to the drawings showing an embodiment thereof.

Figure 1:
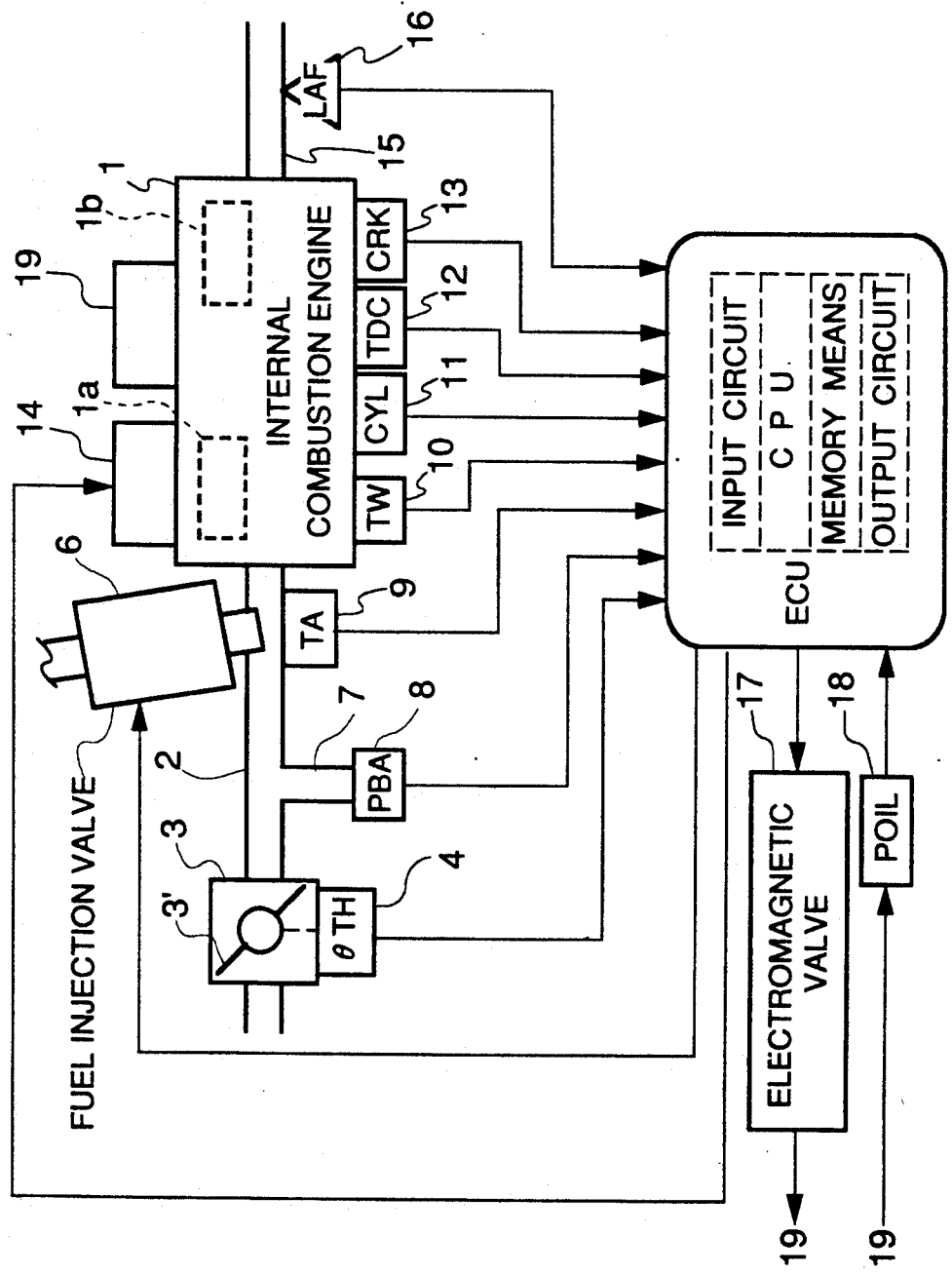
FIG. 1 is a block diagram showing the whole arrangement of an air-fuel ratio control system for an internal combustion engine according to an embodiment of the invention.

Referring first to FIG. 1, there is illustrated the whole arrangement of an air-fuel ratio control system for an internal combustion engine.

In the figure, reference numeral 1 designates a DOHC straight-type four-cylinder internal combustion engine (hereinafter, referred to as merely "the engine") having a pair of intake valves 1a and a pair of exhaust valves 1b provided for each cylinder. The engine 1 is provided with a valve timing changeover mechanism 19, which is capable of changing the valve timing of the intake valves 1a and the exhaust valves 1b between a high-speed valve timing (high speed V/T) suitable for engine operation in a higher engine rotational speed region and a low-speed valve timing (low speed V/T) suitable for engine operation in a lower engine rotational speed region. The term "valve timing" used in this specification includes the valve opening timing and/or valve opening period, as well as the valve lift.

Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying same to an electronic control unit (hereinafter referred to as "the ECU") 5.

Fuel injection valves 6, only one of which is shown, are inserted into the interior of the intake pipe 2 at locations intermediate between the cylinder block of the engine 1 and the throttle valve 3' and slightly upstream of respective intake valves 1a. The fuel injection valves 6 are connected to a fuel tank, not shown, and electrically connected to the ECU 5 to have their valve opening periods controlled by signals therefrom.

On the other hand, an intake pipe absolute pressure (PBA) sensor 8 is provided in communication with the interior of the intake pipe 2 via a conduit 7 at a location immediately downstream of the throttle valve 3' for supplying an electric signal indicative of the sensed absolute pressure within the intake pipe 2 to the ECU 5.

An intake air temperature (TA) sensor 9 is mounted in the wall of the intake pipe 2 at a location downstream of the conduit 7 for supplying an electric signal indicative of the sensed intake air temperature to the ECU 5.

An engine coolant temperature (TW) sensor 10, which may be formed of a thermistor or the like, is mounted in the cylinder block of a cylinder which is filled with engine coolant, to supply an electric signal indicative of the sensed engine coolant temperature TW to the ECU 5.

A cylinder-discriminating (CYL) sensor 11, a TDC sensor 12, and a crank angle (CRK) sensor 13 are arranged in facing relation to a camshaft or a crankshaft, neither of which is shown, of the engine 1 at respective predetermined locations thereof. The CYL sensor 11 generates a pluse signal (hereinafter referred to as "CYL signal pulse") at a predetermined crank angle of a particular cylinder whenever the crankshaft rotates two rotations or through 720 degrees and supplies the CYL signal pulse to the ECU 5.

The TDC sensor 12 generates a pulse signal (hereinafter referred to as "TDC signal pulse") at each of predetermined crank angles whenever the crankshaft rotates through 180 degrees, the pulse being supplied to the ECU 5.

The CRK sensor 13 generates a pulse signal (hereinafter referred to as "CRK signal pulse") whenever the crankshaft rotates through a predetermined crank angle (e.g. 30°) smaller than the predetermined angle through which the crankshaft rotates to cause a TDC signal pulse to be generated, i.e., 180 degrees and supplies the CRK signal pulse to the ECU 5.

A spark plug 14 of each cylinder is electrically connected to the ECU 5 to have its ignition timing controlled by a signal therefrom. Mounted in the exhaust pipe 15 of the engine 1 is an oxygen concentration sensor (referred to hereinafter as "the LAF sensor") 16 having an output characteristic approximately proportional to the concentration of oxygen in the exhaust gases, for supplying an electric signal indicative of the sensed oxygen concentration to the ECU 5.

An electromagnetic valve 17 is connected to the ECU 5 to have its valve opening and closing operation controlled by a signal therefrom. The electromagnetic valve 17 changes the valve timing, specifically changes operating oil pressure from a high level to a low level or vice versa in the valve timing changeover mechanism 19 to thereby change the valve timing between the high speed V/T and the low speed V/T. The operating oil pressure of the valve timing changeover mechanism is detected by an oil pressure (POIL) sensor 18 to supply an electric signal indicative of the sensed oil pressure to the ECU 5.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter referred to as "the CPU") 5b, memory means 5c comprising a ROM storing various operational programs which are executed in the CPU 5b, various maps and tables, etc., and a RAM for storing results of calculations therefrom, etc., and an output circuit 5d which outputs driving signals to the fuel injection valves 6, the spark plugs 14 and the electromagnetic valve 17.

The CPU 5b operates in response to the above-mentioned signals from the sensors to determine operating conditions in which the engine 1 is operating, such as an air-fuel ratio feedback control region and open-loop control regions, and calculates, based upon the determined operating conditions, the valve opening period or fuel injection period $T_{OUT}$ over which the fuel injection valves 6 are to be opened by the use of the following equation (I) in synchronism with generation of TDC signal pulses:

$$T_{OUT} = TiM \times KCMDM \times KLAF \times K_1 + K_2 \quad (1)$$

where TiM represents a basic fuel amount, more specifically a basic fuel injection period which is determined according to the engine rotational speed NE and the intake pipe absolute pressure PBA. The value TiM is determined by two TiM maps stored in the memory means 5c, one of which is a TiML map for low V/T, and the other is a TiMH map for high V/T.

KCMDM is a modified desired air-fuel ratio coefficient which is calculated by multiplying a desired air-fuel ratio coefficient KCMD representing a desired air-fuel ratio by a fuel cooling correction coefficient KETV. The correction coefficient KETV is intended to apply a prior correction to the fuel injection amount in view of the fact that the air-fuel ratio of a mixture supplied to the engine varies due to the cooling effect produced when fuel is actually injected, and its value is set according to the value of the desired air-fuel ratio coefficient KCMD.

KLAF is an air-fuel ratio correction coefficient which is set such that the air-fuel ratio detected by the LAF sensor 16 during air-fuel ratio feedback control becomes equal to the desired air-fuel ratio, and is set to predetermined values depending on engine operating conditions during open-loop control.

$K_1$ and $K_2$ are other correction coefficients and correction variables, respectively, which are calculated based on various engine parameter signals to such values as to optimize characteristics of the engine such as fuel consumption and accelerability, depending on engine operating conditions.

Figure 2:
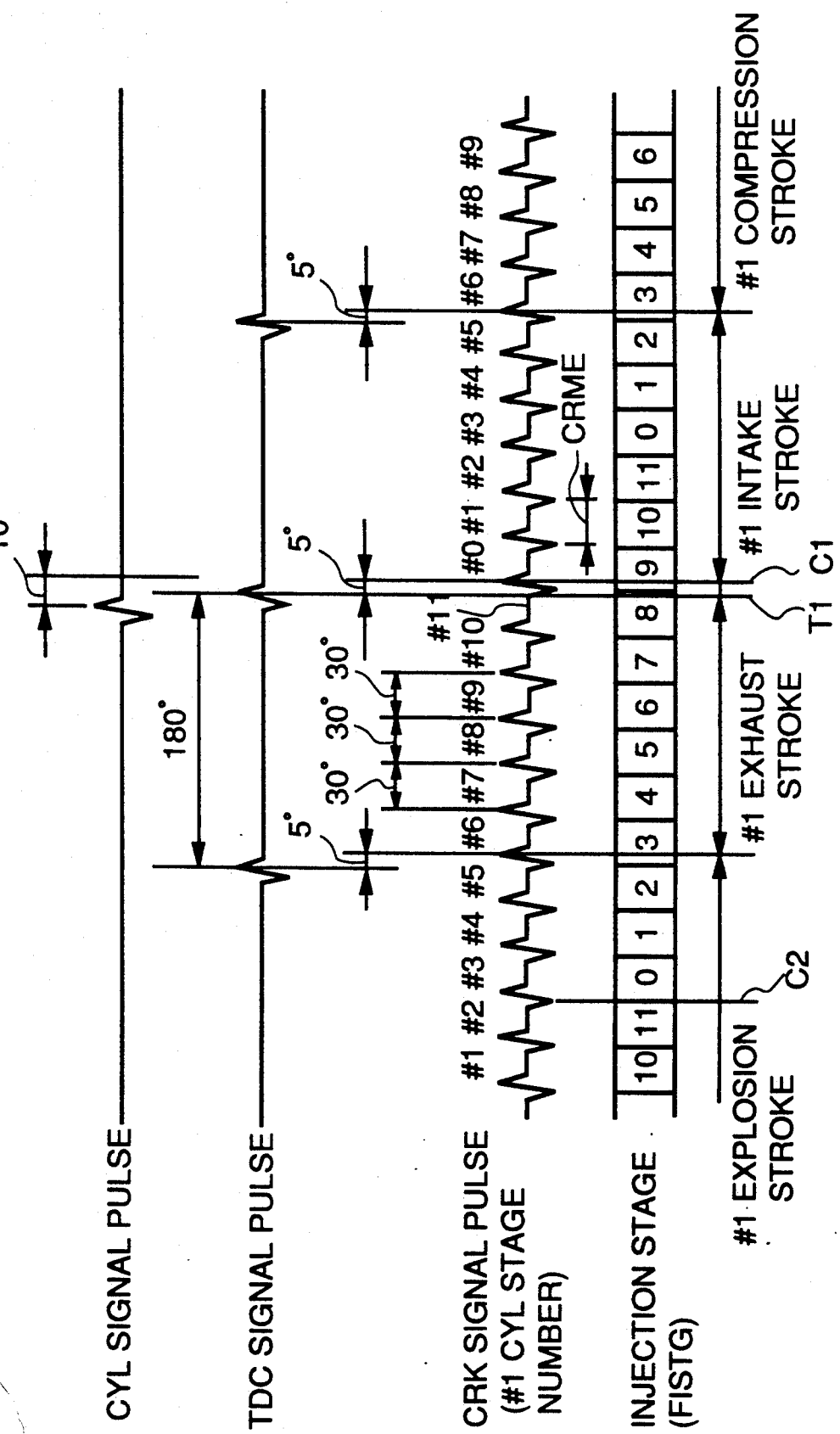
FIG. 2 is a timing chart showing timings of generation of CYL signal pulses, TDC signal pulses, and CRK signal pulses.

FIG. 2 is a timing chart showing timings of generation of CYL signal pulses from the CYL sensor 11, TDC signal pulses from the TDC sensor 12, and CRK signal pulses from the CRK sensor 13.

TDC signal pulses are each generated at a predetermined crank angle (e.g. 5° BTDC) before a top dead center (TDC) of each cylinder corresponding to the start of the intake stroke whenever the crankshaft rotates through 180°. TDC signal pulses are used as pulses indicative of a reference crank angle position of each cylinder.

CYL signal pulses are each generated at a predetermined crank angle position (e.g. 10° BTDC) of a particular cylinder (e.g. #1 CYL) preceding a TDC signal pulse position of the cylinder at which is generated a TDC signal pulse which is indicative of the start of the intake stroke of the cylinder, whereby a particular cylinder number (e.g. #1 CYL) is assigned to the TDC signal pulse generated immediately after occurrence of the CYL signal pulse.

The CRK sensor 13 generates e.g. 24 CRK signal pulses whenever the crankshaft rotates two rotations, i.e., one pulse whenever the crankshaft rotates through 30°. The ECU 5 measures a time interval CRME of occurrence of each two adjacent CRK signal pulses, and calculates the sum ME of the measured values CRME over a time interval of occurrence of each two adjacent TDC pulses to thereby calculate the engine rotational speed NE, which is the reciprocal of the ME value.

The ECU 5 determines crank angle stages (hereinafter referred to as "stages") reached by each cylinder after the reference crank angle position thereof, based on TDC signal pulses and CRK signal pulses. More specifically, assuming that a CRK signal pulse C1 is generated immediately after occurrence of a TDC signal pulse, at a TDC signal position corresponding to termination of the compression stroke of #1 CYL, the ECU 5 detects a #0 stage of #1 CYL by the CRK signal pulse, and successively detects a #1 stage, a #2 stage, ..., a #23 stage by CRK signal pulses generated thereafter.

Further, the ECU 5 determines fuel injection stages FISTG in synchronism with occurrence of CRK signal pulses which detect particular stages. More specifically, for example, the ECU 5 determines, by means of a counter, a #0 injection stage FISTG when the counter counts a CRK signal pulse C2 corresponding to the #3 stage, and then successively detects a #1 injection stage, a #2 injection stage, ..., a #11 injection stage as the counter counts CRK signal pulses are generated thereafter.

Figure 3:
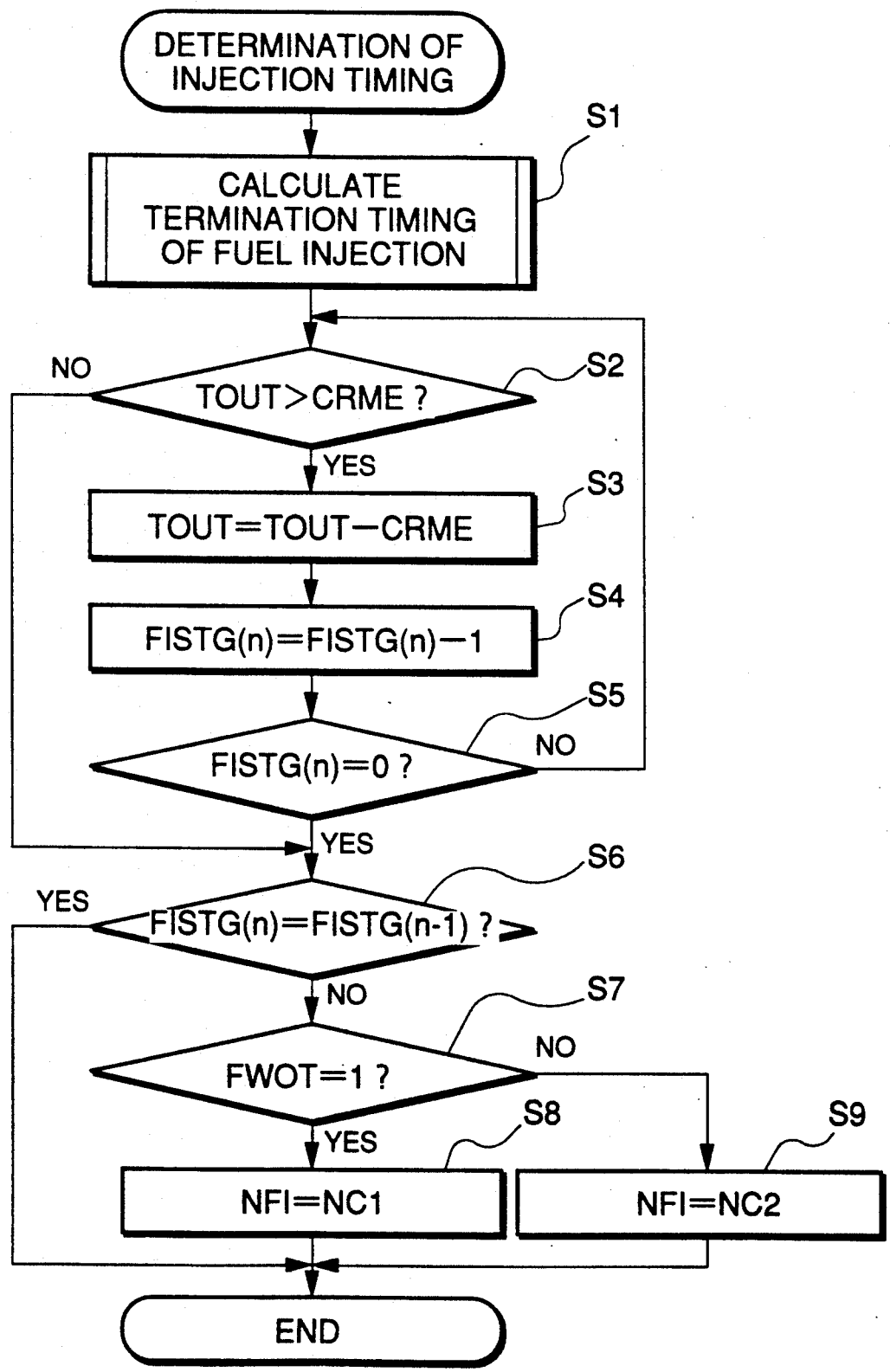
FIG. 3 is a flowchart showing a routine for determining fuel injecting timing.

FIG. 3 shows a routine for determining the fuel injection timing. This program is executed in synchronism with generation of TDC signal pulses.

First, at a step S1, timing of termination of fuel injection is calculated. The termination timing of fuel injection is determined base on the intake pipe absolute pressure PBA and the engine coolant temperature TW, by a fuel injection termination calculating routine, not shown.

Then, at a step S2, it is determined whether or not the fuel injection period Tout calculated by the aforementioned equation (1) is larger than a value CRME, which indicates a time period corresponding to the time period of one stage (refer to FIG. 2). If the answer is negative (NO), i.e., if Tout≦CRME, the program proceeds to a step S6. If the answer at the step S2 is affirmative (YES), the value CRME is subtracted from the fuel injection period Tout to renew the value Tout, at a step S3. Then, at a step S4, an injection stage FISTG(n) is calculated, which corresponds to the renewed fuel injection period Tout. At the next step S5, it is determined whether or not the calculated injection stage FISTG(n) is equal to a value of 0. If the answer is affirmative (YES), the program proceeds to the step S6, whereas if the answer is negative (NO), the program returns to the step S2. That is, the steps S2 to S5 are repeatedly executed until the renewed fuel injection period Tout which is calculated at the step S3 becomes smaller than the CRME value, and if TOUT≦CRME holds, then the step S6 is executed. In this way, as the fuel injection period Tout is successively subtracted by the CRME value, the injection stage FISTG(n) is successively decremented, and the timing of start of the fuel injection is determined by the injection stage FISTG(n) which corresponds to the Tout value when Tout≦CRME holds.

At the step S6, it is determined whether or not the injection stage FISTG(n) in the present loop is identical with the injection stage FISTG(n−1) in the last loop. If the answer is affirmative (YES), it is determined that there has been no change in the operating mode due to a change in the injection timing, and then the program is terminated. On the other hand, if the answer at the step S6 is negative (NO), i.e., it is determined that the operating mode has been changed due to a change in the injection timing. Then the program proceeds to a step S7, wherein it is determined whether or not a flag FWOT has been set to a value of 1, i.e. whether or not the engine is in a predetermined high load operating condition, e.g. a condition in which the throttle valve 3' is fully open. If the answer is affirmative (YES), it is determined that the engine is in the predetermined high load operating condition, and then at a step S8, a count NFI of a hold counter for injection timing is set to a first predetermined value NC1, followed by terminating the program. If the answer at the step S7 is negative (NO), it is determined that the engine is not in the high load operating condition, and then at a step S9, the count NFI is set to a second predetermined value NC2, followed by terminating the program.

The first and second predetermined values NC1, NC2 are each set at a value corresponding to the time period between the time fuel is injected by the fuel injection 6 and the time the injected fuel reaches, in the form of a combustion gas, the LAF sensor (the number of times of generation of TDC signal pulses). When the engine is not in the predetermined high load operating condition, fluctuations in the air-fuel ratio resulting from a change in the injection timing continue longer than when the engine is in the predetermined high load operating condition. Therefore, the second predetermined value NC2 applied when the engine is not in the high load operating condition is set to a larger value than the first predetermined value NC1 applied when the engine is in the high load operating condition. For example, NC1=20, and NC2=30.

Figure 4:
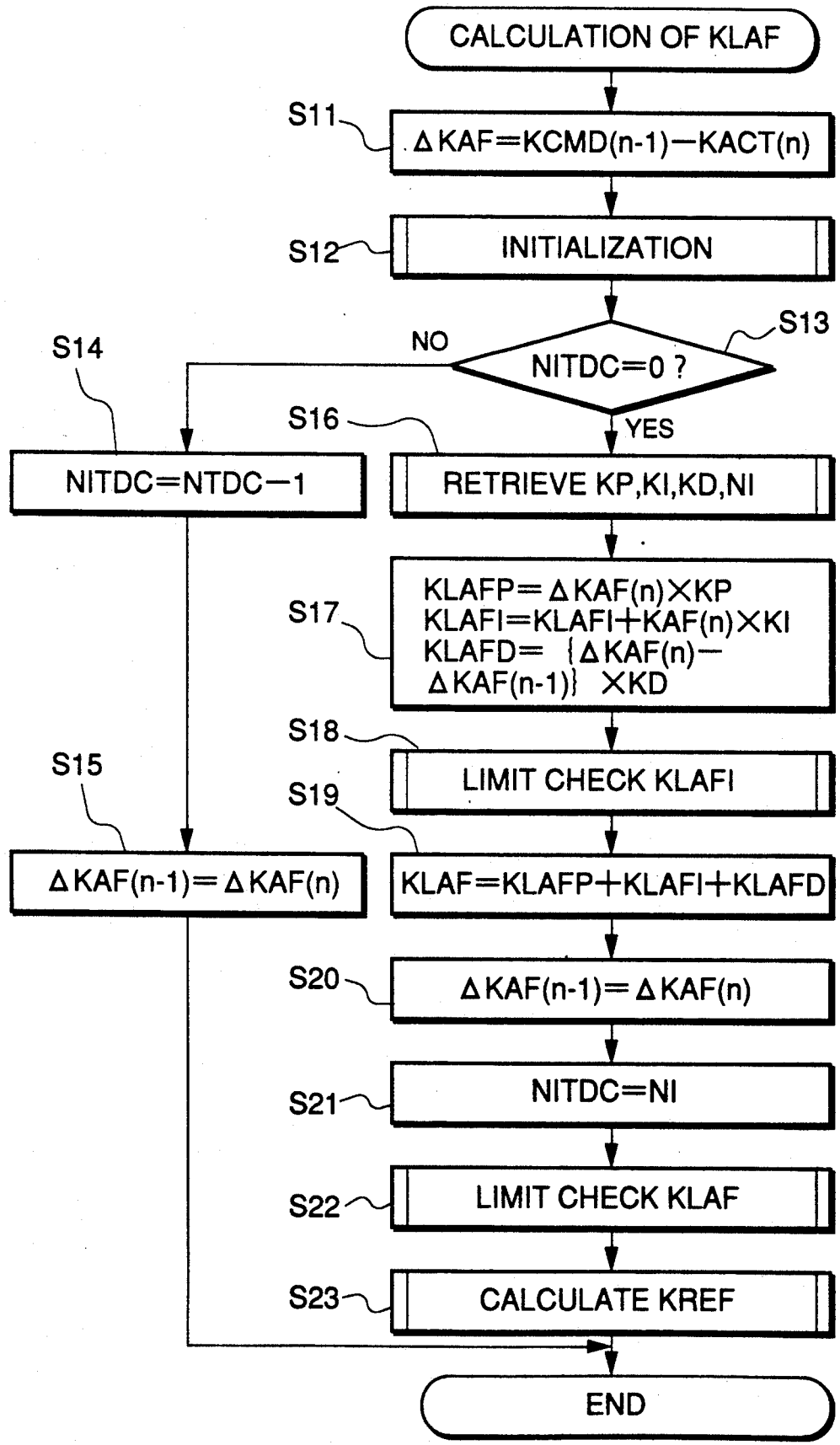
FIG. 4 is a flowchart showing a routine for calculating an air-fuel ratio correction coefficient.

FIG. 4 shows a subroutine for calculating the air-fuel ratio correction coefficient KLAF. This program is executed in synchronism with generation of TDC signal pulses.

First, at a step S11, the desired air-fuel ratio correction coefficient KCMD is determined by searching a map in accordance with engine operating parameters including the engine rotational speed NE and the intake pipe absolute pressure PBA, and an equivalent ratio KACT (14.7/(A/F)) of the air-fuel ratio detected by the LAF sensor 17 (hereinafter referred to as "the detected air-fuel ratio coefficient") is calculated. The air-fuel ratio difference ΔKAF between a value of the desired air-fuel ratio coefficient KCMD(n−1) obtained in the last loop, and a value of the detected air-fuel ratio coefficient KACT obtained in the present loop is calculated. The detected air-fuel ratio coefficient KACT has a value corrected in response to the intake pipe absolute pressure PBA, the engine rational speed NE, and the atmospheric pressure PA, in view of the fact that the exhaust pressure varies with changes in these parameters.

At a step S12, the desired air-fuel ratio correction coefficient KLAF, etc. are initialized in response to engine operating conditions by an initialization routine, described hereinafter.

Then, the program proceeds to a step S13, wherein it is determined whether or not a thinning TDC variable NITDC is equal to a value of 0. The thinning TDC variable NITDC is for updating the air-fuel ratio correction coefficient KLAF whenever TDC signal pulses equal in number to a thinning number NI to which the thinning TDC variable NITDC is set in response to engine operating conditions are generated. When the answer at the step S13 is negative (NO), i.e., if NITDC>0, the value NITDC is decremented by 1 at a step S14, and then, at a step S15, a value DKAF(n) of air fuel-ratio difference ΔKAF in the present loop is set to a value DKAF(n−1) in the last loop, followed by terminating the program. If the answer at the step S13 is affirmative (YES), i.e., if NITDC=0, the program proceeds to a step S16 for updating the KLAF value. More specifically, if the answer at the step S13 is affirmative (YES), the change rate, i.e., a proportional term (P-term) coefficient KP, an integral term (I-term) coefficient KI, a differential term (D-term) coefficient KD, and the thinning number NI are determined by searching a KP map, a KI map, a KD map, and a NI map. The KP map, the KI map and the KD map each have predetermined values set for a plurality of engine operating regions which are determined by the engine rotational speed NE, the intake pipe absolute pressure PBA, etc. The KP, KI, and KD values are determined by retrieving the maps according to the above parameter values to read map values and by calculation by means of interporation, if required. The KP map, KI map and KD map are stored in the memory means 5C (ROM) of the ECU 5. In particular, according to the present embodiment, these maps are set such that optimum values can be obtained in response to engine operating conditions such as a steady operating condition, a transient operating condition due to a change in the operating mode, and a decelerating condition.

Next, at a step S17, a P-term KLAFP, an I-term LAFI, and a D-term KAFD are calculated by the use of the following equations (2)-(4):

$$KLAFP = \Delta KAF(n) \times KP \quad (2)$$

$$KLAFI = KLAFI + \Delta KAF(n) \times KI \quad (3)$$

$$KLAFD = (DKAF(n) - DKAF(n-1)) \times KD \quad (4)$$

Then, at a step S18, limit checking of the calculated I-term KLAFI is carried out. More specifically, the KLAFI value is compared with a predetermined upper limit LAFIH and a predetermined lower limit LAFIL. If the KLAFI value is larger than the upper limit LAFIH, the KLAFI value is set to the upper limit value LAFIH, while if the KLAFI value is smaller than the lower limit LAFIL, the KLAFI value is set to the lower limit LAFIL.

At the next step S19, the P-term KLAFP, the I-term KLAFI and the D-term KLAFD calculated as above are added together to obtain a value of the air-fuel ratio correction coefficient KLAF, followed by setting a value DKAF(n) of the air-fuel ratio difference ΔKAF in the present loop to a value DKAF(n−1) obtained in the last loop at a step S20 and further setting the thinning TDC variable NITDC to the thinning number NI obtained at the step S16, at a step S21.

Then, at a step S22, limit checking of the calculated KLAF value is carried out by comparing the calculated KLAF value with predetermined upper and lower limits KLAFH, KLAFL, setting the KLAF value to the predetermined upper limit KLAFH when the former exceeds the latter, and setting the KLAF value to the predetermined lower limit KLAFL when the former is less than the latter.

At a step S23, a learned value KREF of KLAF values is calculated, followed by terminating the program. The calculation of the learned value KREF is carried out by the use of the following equation (5) only when the KLAFI value and the KLAF value are within the respective predetermined ranges defined by the predetermined upper and lower limits, at the step S18, S22. That is, the calculation is executed only when KLAFIL<KLAFI<KLFIH and KLAFL<KLAF<KLAFH hold:

$$KREF = \frac{CREF}{65536} \times KLAFI + \frac{65536 - CREF}{65536} \times KREF(n-1) \quad (5)$$

where CREF is a variable which is set to an appropriate value within a range of 1 to 65536 according to engine operating conditions, and KREF(n-1) is a value of the learned value KREF obtained in the last loop.

According to the equation (5), the learned value KREF is calculated as an average value of the integral term KLAFI. However, since the integral term KLAFI will be almost equal to the correction coefficient KLAF under a steady operating condition of the engine. Therefore, the learned value KREF calculated as above can be regarded as an average value of the KLAF value.

Figure 5:
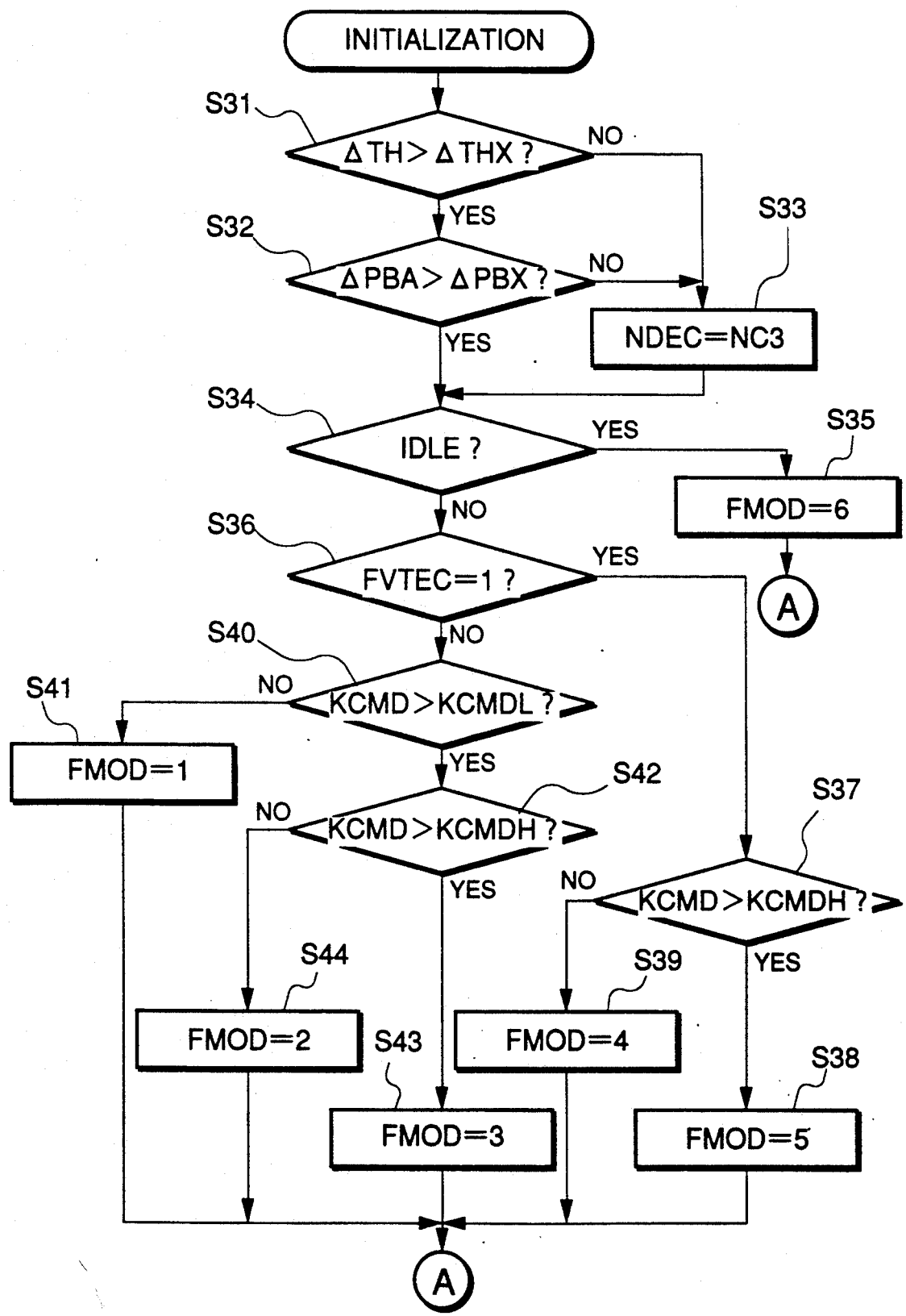
FIG. 5 is a flowchart showing a part of a routine for initializing the air-fuel ratio correction coefficient.
Figure 6:
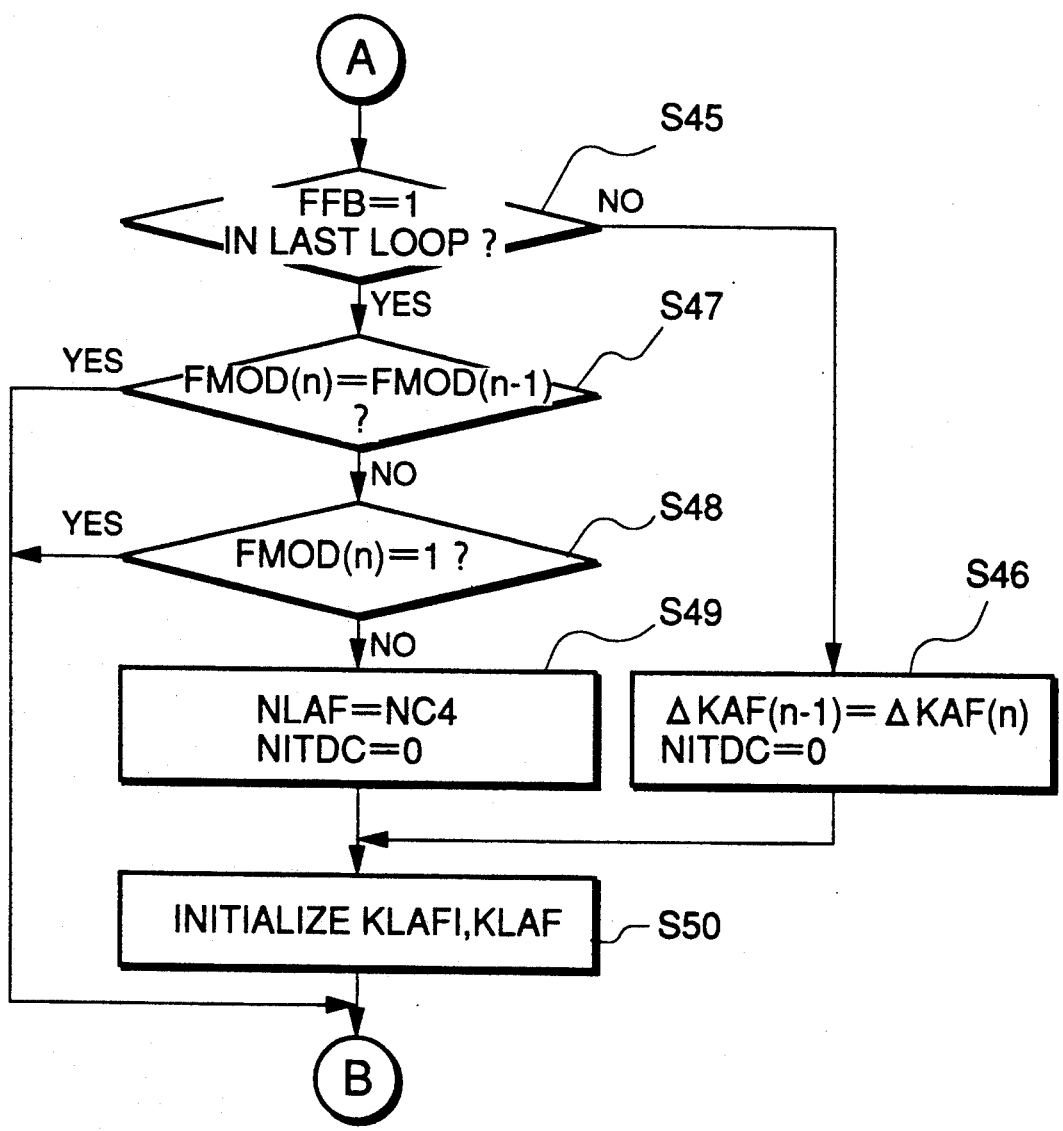
FIG. 6 is a flowchart showing another part of the initialization routine.
Figure 7:
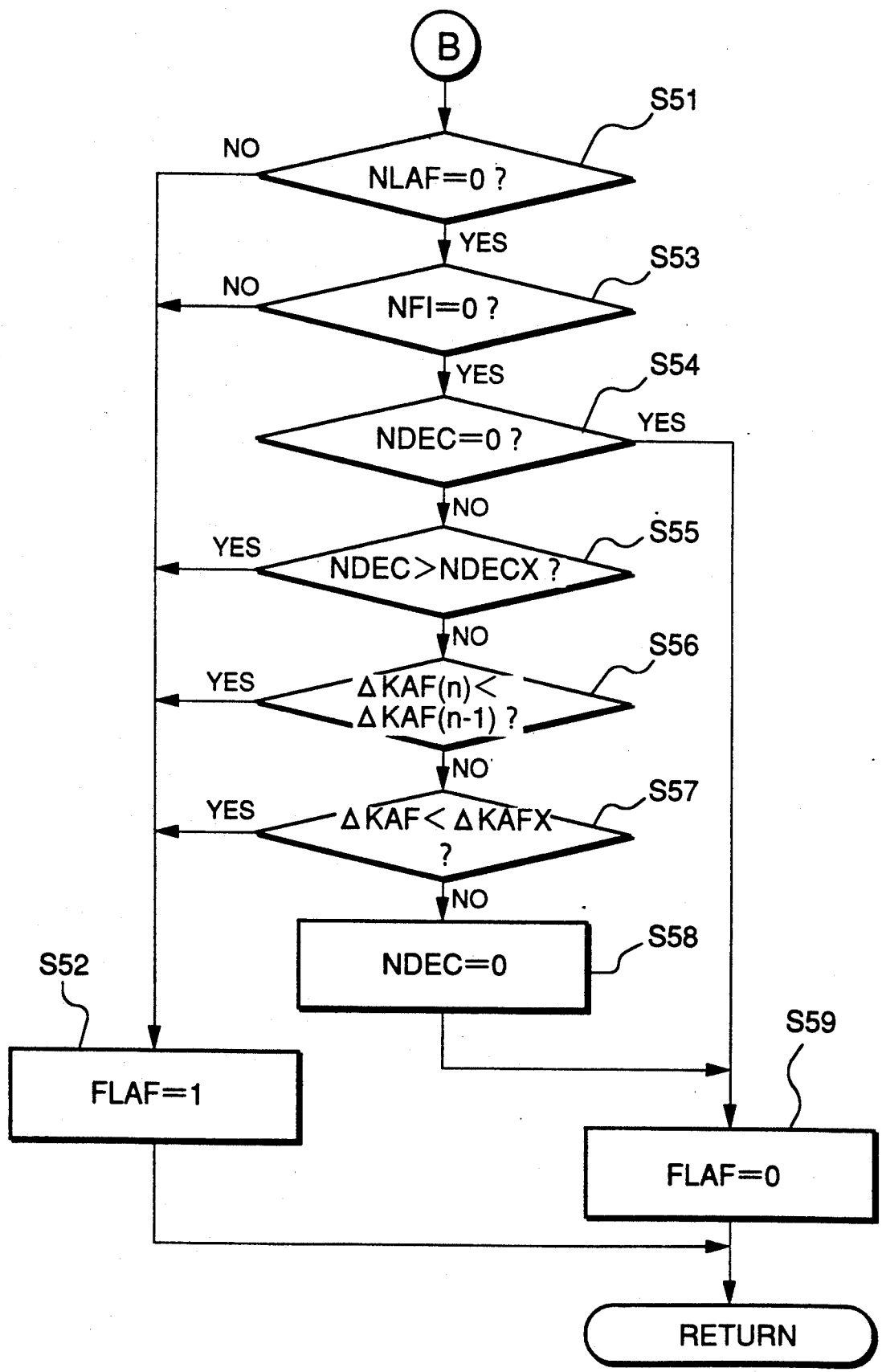
FIG. 7 is a flowchart showing still another part of the initialization routine.

FIGS. 5-7 show an intialization routine for initializing the air-fuel ratio correction coefficient, which is executed at the step S12 in FIG. 4.

In FIG. 5 first, at a step S31, it is determined whether or not the valve opening difference ΔTH between a value of the valve opening θTH in the last loop and a value thereof in the present loop is larger than a predetermined value ΔTHX (e.g. 2°). Then, at a step S32, it is determined whether or not the pressure difference ΔPBA between a value of the intake pipe absolute pressure PBA in the last loop and a value thereof in the present loop is larger than a predetermined value ΔPBX (e.g. 43 mmHg). When at least one of the answers at the steps S31 and S32 is negative (NO), it is determined that the engine is in a predetermined decelerating condition, since then there has occurred a large change in the valve opening θTH of the throttle valve 3' and/or the intake pipe absolute pressure PBA toward the deceleration side between the last loop and the present loop. Then, the program proceeds to a step S33 to set a count of a hold counter NDEC for deceleration to a third predetermined value NC3, followed by the program proceeding to a step S34. The third predetermined value NC3 is set at a time period within which the actual air-fuel ratio detected by the LAF sensor 16 changes from a rich state to a lean value into the desired air-fuel ratio when the engine shifts from the predetermined decelerating condition to a steady operating condition. For example, the value NC3 is set at 30. In other words, so long as the engine is in the predetermined decelerating condition, the count NDEC is held at NC3.

On the other hand, when the answer at the step S31 and S32 are both affirmative (YES), it is judged that the engine is not in the predetermined decelerating condition, and then the program proceeds to the step S34, wherein it is determined whether or not the engine is in an idling condition. This determination is made by determining whether or not the engine rotational speed NE is below a predetermined low value (e.g. 900 rpm), and at the same time the throttle valve opening θTH is below a predetermined value θidl, or whether or not the engine rotational speed NE is below the above predetermined low value, and at the same time, intake pipe absolute pressure PBA is below a predetermined value. If the answer at the step S34 is affirmative (YES), a mode flag FMOD is set to 6, and then the program proceeds to a step S45 in FIG. 6.

On the other hand, if the answer at the step S34 is negative (NO), it is determined at a step S36 whether or not a flag FVTEC assumes a value of 1 to determine whether the valve timing has been set to the high V.T. If the answer is affirmative (YES), it is determined at a step S37 whether or not the desired air-fuel ratio coefficient KCMD is larger than a predetermined upper limit KCMDH (e.g. 1.13). If the answer is affirmative (YES), it is judged that the mixture supplied to the engine is rich, and then the mode flag FMOD is set to a value of 5, and then the program proceeds to the step S45 in FIG. 6. If the answer at the step S37 is negative (NO), the mode flag FMOD is set to a value of 4, and then the program proceeds to step S45.

On the other hand, if the answer at the step S36 is negative (NO), i.e., when it is determined that the valve timing has been set to the low V/T, it is determined at a step S40 whether or not the desired air-fuel ratio coefficient KCMD is larger than a predetermined lower limit KCMDL (e.g. 0.98). If the answer is negative (NO), this means that the engine is in a lean-burn condition, and then the mode flag FMOD is set to a value of 1, followed by the program proceeding to the step S45. If the answer at the step S40 is affirmative (YES), it is determined at a step S42, whether or not the desired air-fuel ratio coefficient KCMD is larger than the predetermined upper limit KCMDH. If the answer is affirmative (YES), it is determined that the mixture is rich, and then the mode flag FMOD is set to a value of 3, followed by the program proceeding to the step S45. If the answer at the step S42 is negative (NO), this means that the mixture is approximately equal to a stoichiometric air-fuel ratio (e.g. $0.98 < KCMD < 1.13$), and then the mode flag FMOD is set to a value of 2, followed by the program proceeding to the step S45.

In this way, the mode flag FMOD is set to different values depending upon whether the engine is in the idling condition, the value timing selected, and the desired air-fuel ratio of the mixture, and then the program executes the steps S45 et seq.

At the step S45, it is determined whether or not a flag FFB has been set to a value of 1 in the last loop, i.e., whether or not the engine was in the feedback control operating region in the last loop. This determination is made based upon the engine rotational speed and the engine coolant temperature TW, by a feedback control routine, not shown, which is executed in synchronism with TDC signal pulses. More specifically, in the feedback routine, it is determined whether or not the flag FFB was set to 1 in the last loop executed upon generation of the last TDC signal pulse. If the answer at the step S45 is negative (NO), it is determined that the engine was not in the feedback control operating region in the last loop, but the former has entered the latter in the present loop. Then, the air-fuel ratio difference ΔKAF(n) in the present loop is set to a value ΔKAF(n−1) obtained in the last loop, and the thinning TDC variable NITDC is set to 0, followed by the program proceeding to a step S50.

On the other hand, if the answer at the step S45 is affirmative (YES), it is judged that the engine was already in the feedback control region in the last loop, and then the program proceeds to a step S47 wherein it is determined whether or not the mode flag FMOD (n) in the present loop is identical with the value FMOD(n−1) in the last loop.

If the answer at the step S47 is affirmative (YES), that is, if no change has occurred in the mode flag FMOP, the program proceeds to a step S51 in FIG. 7. If the answer at the step S47 is negative (NO), it is determined at a step S48 whether or not the mode flag FMOD assumes 1 in the present loop. If it assumes 1, it means that the control mode has shifted to the lean-burn control wherein fluctuations in the air-fuel ratio would not cause overriching of the mixture, and then the program proceeds to the step S51 in FIG. 7, whereas if the answer at the step S48 is negative (NO), it means that a change has occurred in the mode flag FMOD, and the change is not to shift the control mode to the lean-burn control. Therefore, a count of a hold counter NLAF for the air-fuel ratio correction coefficient is set to a fourth predetermined value NC4 at a step S49, and then the program proceeds to the step S50.

The fourth predetermined value NC4 is set at a value corresponding to a time period between the time fuel is injected and the time the injected fuel or combustion gas reaches the LAF sensor 16, when the desired air-fuel ratio has been changed. For example, it is set to 20.

Then, at the step 50, the I-term KLAFI and the air-fuel ratio correction coefficient KLAF are initialized to KREF values depending upon the set value of the mode flag FMOP, as shown in Table given below:

| FMOD | INITIALIZATION |
|------|----------------|
| 1 | KLAFI = KREFL1 |
|   | KLAF = KREFL1 |
| 2 | KLAFI = KREFL0 |
|   | KLAF = KREFL0 |
| 3 | KLAFI = KREFL2 |
|   | KLAF = KREFL2 |
| 4 | KLAFI = KREFH0 |
|   | KLAF = KREFH0 |
| 5 | KLAFI = KREFH2 |
|   | KLAF = KREFH2 |
| 6 | KLAFI = KREFIDL |
|   | KLAF = KREFIDL |

Then, the program proceeds to the step S51 in FIG. 7, wherein it is determined whether or not the count of the hold counter NLAF assumes 0. On this occasion, since the thinning TDC variable NITDC has been set to 0, the hold counter NLAF for the air-fuel ratio correction coefficient is counted down in synchronism with each TDC signal pulse. If the answer at the step S51 is negative (NO), that is, if a transient condition caused by a change in the operating mode is not over yet, a flag FLAF is set to 1 in order to set the change rate of the air-fuel ratio correction coefficient KLAF to a smaller value, at a step S52, followed by the program returning to the main routine of FIG. 4.

On the other hand, if the answer at the step S51 is affirmative (YES), that is, if no change has occurred in the operating mode, or a predetermined time period (e.g. corresponding to 20 TDC signal pulses) has elasped after a change occurred in the operating mode, the program proceeds to a step S53 to determine whether or not the count of the hold counter NFI for fuel injection timing is equal to 0. As mentioned before, the hold counter NFI has been set to the first predetermined value NC1 or the second predetermined value NC2 in the step S8 or S9 in FIG. 3 in the case where the fuel injection timing (injection stage) is different between the last loop and the present loop. Like the hold counter NLAF for air-fuel ratio correction coefficient, the hold counter NFI is counted down in synchronism with generation of each TDC signal pulse. If the answer at the step S53 is negative (NO), it is judged that the engine is in a transient state caused by a change in the fuel injection timing, and then the flag FLAF is set to 1 at a step S52, followed by the program returning to the FIG. 4 main routine.

On the other hand, if the answer at the step S53 is affirmative (YES), it is judged that no change has occurred in the operating mode, and then the program proceeds to a step S54 to determine whether or not the count of the hold counter NDEC for deceleration assumes 0. As mentioned before, the hold counter NDEC was set to the third predetermined value NC3 (e.g. 30) at the step S33 in FIG. 5 when the engine was in the predetermined decelerating condition. So long as the engine is in the predetermined decelerating condition, NDEC=NC3 continues, but after the engine shifts into a steady operating condition, the count value is decremented by 1 whenever a TDC signal pulse is generated. When the answer at the step S54 is negative (NO), it is determined at a step S55 whether or not the hold counter NDEC for deceleration assumes a value larger than a predetermined value NDECX. The predetermined value NDECX is set at a value smaller than the third predetermined value NC3, e.g. 20. If the answer is affirmative (YES), it is judged that the engine is in a transient condition from deceleration to a steady operating condition, and then the flag FLAF is set to 1 at a step S52, followed by the program returning to the FIG. 4 main routine.

If the answer at the step S55 is negative (NO), the program proceeds to a step S56 to determine whether or not the air-fuel ratio difference $\Delta KAF$ (n) in the present loop is smaller than the value $\Delta KAF$ (n−1) in the last loop. If the answer is affirmative (YES), it is judged that the actual air-fuel ratio is changing toward the richer side, and then the flag FLAF is set to 1, followed by the program proceeding to the FIG. 4 main routine.

On the other hand, if the answer at the step S56 is negative (NO), it is judged that the actual air-fuel ratio is changing from a rich value toward a lean value, and then the program proceeds to a step S57 to determine whether or not the air-fuel ratio difference $\Delta KAF$ is smaller than a predetermined value $\Delta KAFX$. If the answer is affirmative (YES), the flag FLAF is set to 1, and the program returns to the FIG. 4 main routine, whereas if the answer at the step S57 is negative (NO), it is judged that the mixture is approximately equal to the desired air-fuel ratio coefficient KCMD, and then the hold counter NDEC is reset to 0, and the flag FLAF is set to 0 at a step S59, followed by the program returning to the FIG. 4 main routine.

If all the answers at the steps S51, S53 and S54 are affirmative (YES), it is judged that the engine is in a normal steady operating condition, and then the flag FLAF is set to 0 at the step S59, followed by the program proceeding to the main routine.

Figure 8:
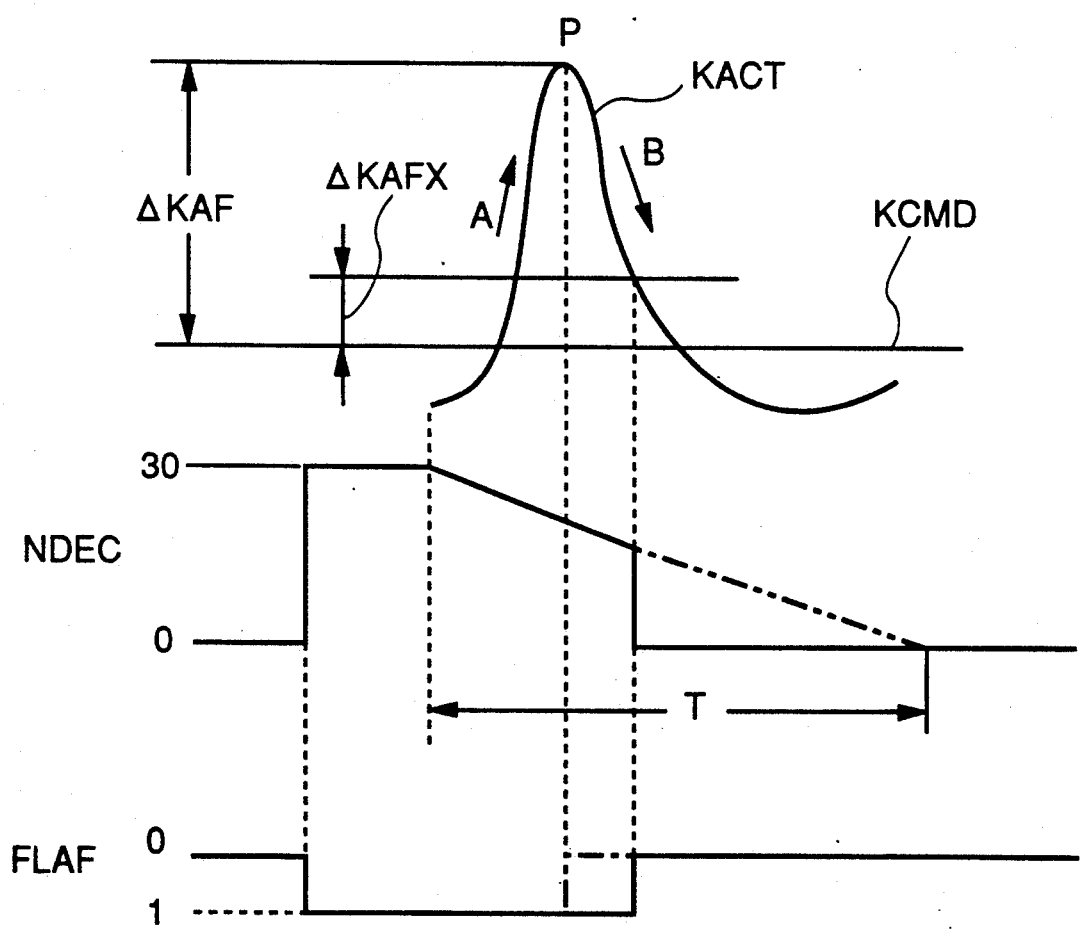
FIG. 8 is a timing chart useful in explaining a manner of setting the air-fuel ratio correction coefficient when the engine has shifted from a decelerating condition to a steady operating condition.

FIG. 8 shows how the flag FLAF is set during transition in from the predetermined decelerating condition to a steady operating condition.

When the engine has shifted to the steady operating condition from the predetermined decelerating condition, the KACT curve corresponding to the output from the LAF sensor 16 sharply rises to a maximal point P. Thereafter, it falls toward the desired air-fuel ratio coefficient KCMD.

While the engine is in the predetermined decelerating condition, the deceleration hold counter NDEC is set to and held at the third predetermined value NC3 and accordingly the flag FLAF is set to 1. Then, when the engine shifts to the steady operating condition, the hold counter NDEC counts down from the third predetermined value NC3 (=30) whenever a TDC signal pulse is generated. After the count NDEC is decreased to the predetermined value, NDECX (=20), the air-fuel ratio difference ΔKAF(n) in the present loop is compared with the value ΔKAF(n−1) in the last loop. When ΔKAF(n)<ΔKAF(n−1) holds, this means that the detected air-fuel ratio coefficient KACT is changing toward the rich side along the sharply rising curve as indicated by the arrow A. That is, the actual air-fuel ratio is changing from the lean side to the rich side. Therefore, the flag FLAF is held at 1. After passing the maximal point P, the detected air-fuel ratio coefficient KACT now descends as indicated by the arrow B. On this occasion, ΔKAF(n)>ΔKAF(n−1) holds, indicating that the actual air-fuel ratio is changing from the rich side to the lean side.

Then, when the air-fuel ratio difference ΔKAF falls below the predetermined value ΔKAFX, it is judged that the engine has entered the steady operating condition, and then the count NDEC is set to 0, and the flag FLAF is set to 0 whereby the control mode is switched over to feedback control with the change rate of the air-fuel ratio correction coefficient set to a relatively large value suitable for the steady operating condition. That is, although initially the deceleration hold counter NDEC is set to the third predetermined value NC3 (corresponding to the time period T in FIG. 8) and at the same time the flag FLAF is set to 1 for setting the change rate to a relatively small value, the flag FLAF is set to 0 when the engine shifts from the decelerating condition to the steady operation condition and further the actual air-fuel ratio changes from a rich value to the lean side to such an extent that the air-fuel ratio difference ΔKAF falls bellow the predetermined value ΔKAFX, wherefrom the air-fuel ratio is feedback-controlled with the change rate of the air-fuel ratio correction coefficient set to a normal or relatively large value.

The change of the change rate of the air-fuel ratio correction coefficient is effected in response to the setting of the flag FLAF by retrieving the maps at the step S16 of the main routine of FIG. 4, as mentioned before. More specifically, when the flag FLAF is set to 0, values of the P-term coefficient KP, the I-term coefficient KI, and the D-term coefficient KD suitable for the steady operating condition, which are set at relatively large values, are read from the maps, while when the flag FLAF is set to 1, that is, when a change has occurred in the operating mode, values of the coefficients KP, KI, KD suitable for a transient condition such as change of the operating mode and deceleration of the engine, which are set at relatively small values, are read from the maps. By thus setting the change rate of the air-fuel ratio correction coefficient, it can be prevented that the air-fuel ratio largely deviates from the desired value during change of the operating mode, during deceleration or immediately after deceleration, thereby preventing degraded exhaust emission characteristics and degraded driveability. Particulary, overleaning of the air-fuel ratio upon transition from deceleration to a steady operating condition can be effectively prevented.

Although in the above described embodiment, changeover of the flag FLAF from 1 to 0 is effected when the air-fuel ratio difference ΔKAF falls below the predetermined value ΔKAFX, alternatively, such changeover may be effected when the detected air-fuel ratio coefficient KACT exceeds the maximal point P, as indicated by the chain line in FIG. 8, also effectively preventing overleaning of the air-fuel ratio.

What is claimed is:

1. In an air-fuel ratio control system for an internal combustion engine, having
   air-fuel ratio detecting means for detecting an actual air-fuel ratio of a mixture supplied to said engine,
   operating condition detecting means for detecting operating conditions of said engine,
   air-fuel ratio calculating means for calculating a desired air-fuel ratio based on operating conditions of said engine detected by said operating condition detecting means, and
   corrected value calculating means for calculating an air-fuel ratio correction value applied for feedback-controlling said actual air-fuel ratio detected by said air-fuel ratio detecting means to said desired air-fuel ratio calculated by said air-fuel ratio calculating means,
   the improvement comprising:
   (1) operating mode change determining means for determining whether or not a change has occurred in operating mode of said engine; and
   (2) corrected value changing means for setting a change rate at which said air-fuel ratio correction value is to be changed, such that when said operating mode change determining means determines that a change has occurred in said operating mode of said engine, said change rate is set to and held at a smaller value than a value assumed when no change has occurred in said operating mode, over a predetermined time period from the time said change occurred.

2. An air-fuel ratio control system as claimed in claim 1, wherein said engine has at least one fuel injection valve, at least one intake valve, and at least one exhaust valve,
   said air-fuel ratio control system including idling condition determining means for determining whether or not said engine is in said idling condition, valve timing changeover means for changing valve timing of at least one of said intake valve and said exhaust valve, valve timing detecting means for detecting operating conditions of said valve timing changeover means, and injection timing determining means for determining timing of injection of fuel by said fuel injection valve,
   said operating mode including an operating mode detected by said idling condition detecting means, an operating mode detected by said valve timing detecting means, an operating mode determined based upon said desired air-fuel ratio calculated by said air-fuel ratio calculating means, and an operating mode determined by said injection timing determining means,
   wherein said operating mode change determining means determines whether or not a change has occurred in said operating mode, from at least one combination of said operating modes.

3. An air-fuel ratio control system as claimed in claim 2, wherein when a change has occured in said operating mode determined by said injection timing determining means, said predetermined time period is set to a larger value when said engine is in an operating condition other than a predetermined high load condition than when said engine is in said predetermined high load condition.

4. An air-fuel ratio control system as claimed in claim 2, wherein said operating mode detected by said valve timing detecting means includes a first operating mode in which a high valve timing suitable for high speed operation of said engine is selected, and a second operation mode in which a low valve timing suitable for low speed operation of said engine is selected.

5. An air-fuel ratio control system as claimed in claim 2, wherein said operating mode based upon said desired air-fuel ratio calculated by said air-fuel ratio calculating means includes a first operating mode in which said desired air-fuel ratio is richer than a stoichiometric air-fuel ratio, a second operating mode in which said desired air-fuel ratio is leaner than said stoichiometric air-fuel ratio, and a third operating mode in which said desired air-fuel ratio is approximately equal to said stoichiometric air-fuel ratio.

6. An air-fuel ratio control system as claimed in claim 1 or 2, wherein said air-fuel ratio detection means comprises an exhaust gas component concentration sensor having an output characteristic approximately proportional to concentration of a specific component in exhaust gases emitted from said engine, said predetermined time period being a time period between the time fuel is injected by said fuel injection valve and the time said fuel reaches, in the form of a combustion gas, said exhaust gas component concentration sensor.

7. An air-fuel ratio control system as claimed in claim 1 or 2, wherein said air fuel ratio detecting means comprises an exhaust gas component concentration sensor having an output characteristic approximately proportional to concentration of a specific component in exhaust gases emitted from said engine, said correction value calculating means calculating said air-fuel ratio correction value in response to an output from said exhaust gas component concentration sensor.

8. An air-fuel ratio control system as claimed in claim 7, wherein said air-fuel ratio correction value comprises at least one of a proportional control term, an integral control term, and a differential control term, at least one of said control terms being set to a smaller value when a change has occurred in said operating mode than when said engine is in a steady operating condition.

* * * * *